(12) United States Patent
Belli et al.

(10) Patent No.: US 6,455,769 B1
(45) Date of Patent: Sep. 24, 2002

(54) ELECTRICAL CABLE HAVING A SEMICONDUCTIVE WATER-BLOCKING EXPANDED LAYER

(75) Inventors: Sergio Belli, Livorno; Alberto Bareggi, Milan; Luigi Caimi, Lomagna; Luca Balconi, Bresso, all of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/597,267

(22) Filed: Jun. 20, 2000

Related U.S. Application Data

(63) Continuation of application No. PCT/EP98/08284, filed on Dec. 17, 1998
(60) Provisional application No. 60/072,147, filed on Jan. 22, 1998.

(30) Foreign Application Priority Data

Dec. 22, 1997 (IT) .......................................... MI97A2839

(51) Int. Cl.[7] ................................................ H01B 7/28
(52) U.S. Cl. ............ 174/23 C; 174/23 R; 174/102 SC; 174/120 SC
(58) Field of Search ............................. 174/23 C, 23 R, 174/102 SC, 105 SC, 120 SC, 102 R, 106 R, 110 F

(56) References Cited

U.S. PATENT DOCUMENTS

| | | |
|---|---|---|
| 4,104,210 A | 8/1978 | Coran et al. |
| 4,145,567 A | 3/1979 | Bahder et al. |
| 4,588,855 A * | 5/1986 | Kutsuwa et al. ...... 174/120 SC |
| 5,010,209 A * | 4/1991 | Marciano-Agostinelli et al. ........................ 174/23 C |
| 5,281,757 A | 1/1994 | Marin et al. |

FOREIGN PATENT DOCUMENTS

| | | |
|---|---|---|
| EP | 0 116 754 | 8/1984 |
| EP | 0 324 430 | 7/1989 |
| EP | 0 577 233 | 1/1994 |

OTHER PUBLICATIONS

Norme Française, (NF C 33–223), "Insulated Cables and Their Accessories for Power Systems", pp. 29–30, Mar. 1998.

* cited by examiner

*Primary Examiner*—Chau N. Nguyen
(74) *Attorney, Agent, or Firm*—Finnegan, Henderson, Farabow, Garret, & Dunner, LLP

(57) ABSTRACT

Electrical cable, in particular for medium- or high-voltage power transmission or distribution, having a metal shield and a semiconductive water-blocking expanded layer. This layer exerts three main functions, the first one is to elastically and uniformly absorb radial forces of expansion and contraction of the cable coating layers due to thermal cycles of the cable during use, thus preventing deformations or breakages in the metal shield, the second one is to ensure electrical continuity between the cable core and the metal shield, the third one is to effectively avoid penetration and propagation of moisture and/or water along the cable core due, e.g., to possible ruptures in the metal shield. The third function is obtained by including in the expanded layer a water-swellable material.

29 Claims, 1 Drawing Sheet

ELECTRICAL CABLE HAVING A SEMICONDUCTIVE WATER-BLOCKING EXPANDED LAYER

This application is a continuation of International Application No. PCT/EP98/08284, filed Dec. 17, 1998 and claims the benefit of provisional application No. 60/072,147, filed Jan. 22, 1998, the content of both of which is incorporated herein by reference.

TECHNICAL FIELD

The present invention relates to an electrical cable, in particular for medium- or high-voltage power transmission or distribution, having a semiconductive water-blocking expanded layer. In the present description, the term "medium voltage" is understood to refer to a voltage of between about 1 kV and about 30 kV, while the term "high voltage" is understood to refer to voltages above 30 kV.

BACKGROUND OF THE INVENTION

Cables for medium- or high-voltage power transmission or distribution generally consist of a metal conductor coated with a first inner semiconductive layer, an insulating layer and an outer semiconductive layer. For some uses, in particular when it needs to be watertight with respect to the exterior, the cable is enclosed inside a metal shield, usually an aluminium or copper shield, consisting of a continuous tube or a metal sheet shaped into a tube and welded or sealed so as to be watertight.

During production, installation or use, breakages and piercings can occur in the metal shield, which allow penetration of moisture or even water into the cable core, with formation of electrochemical trees in the insulation layer, which can cause insulation failure.

A possible solution to this problem is provided in U.S. Pat. No. 4,145,567. A high-voltage cable is described therein having, around the outside of the outer semiconductive layer, a compressible layer of a foamed plastic material which should prevent external moisture from reaching the insulation layer, thus avoiding formation of electrochemical trees. According to that disclosure, the metal shield preferably maintains some pressure against the compressible layer so that no air or other fluid can travel along the interface between the compressible layer and the metal shield. As further insurance against passage of fluid along the cable, the metal shield can be bonded to the compressible layer. The compressible layer is preferably semiconducting.

Ruptures in the metal shield may be caused by the thermal cycles to which the cable is subject as a result of the daily variations in the intensity of the transported current, with corresponding variations in the cable temperature of between room temperature and the maximum operating temperature (for example between 20° C. and 90° C.). These thermal cycles cause dilation and subsequent contraction of the coating layers of the cable, with consequent radial forces exerted on the metal shield. The metal shield can thus suffer mechanical deformations with formation of empty spaces between the shield and the outer semiconductive layer, which may give rise to non-uniformity in the electrical field. At the utmost, these deformations can lead to rupture of the shield, particularly when it is welded or attached by means of sealing, and hence to complete loss of functionality of the shield.

A possible solution to this problem is provided in U.S. Pat. No. 5,281,757, where the metal shield is free to move with respect to the adjacent layers and has the overlapping edge portions bonded together by an adhesive which allows the overlapping edge portions to move relative to each other during the thermal cycling of the cable. A cushioning layer as that disclosed in the above-mentioned U.S. Pat. No. 4,145,567 may be applied between the metal shield and the cable core. If desired, the cushioning layer may be a water swellable tape or a water swellable powder instead of a foamed plastic material.

According to the Applicant's experience, cable designs such as those described in U.S. Pat. Nos. 4,145,567 and 5,281,757 are not completely satisfactory. Firstly, the presence of a compressible layer between metal shield and cable core as disclosed in U.S. Pat. No. 4,145,567 is not sufficient to effectively avoid penetration and propagation of moisture or water along the cable. In fact, to obtain an effective water-blocking effect, in U.S. Pat. No. 5,281,757 it is suggested to use, instead of the compressible layer, a water-swellable tape or powder. However, the introduction of a water-swellable material under the metal shield would cause serious electrical problems. In fact, the metal shield, in addition to constituting a barrier against penetration of water and/or moisture, exerts important electrical functions and needs to be in electrical contact with the outer semiconductive layer. A first function of the metal shield is indeed to create a uniform radial electric field inside the cable and, simultaneously, to cancel out the electric field outside the cable. A further function is to support short-circuit currents.

The presence of an insulating material such as a water-swellable material under the metal shield cannot ensure electrical continuity between the cable core and the metal shield. Moreover, from the point of view of production and handling, the use of water-swellable tapes or of free water-swellable powders has many drawbacks. Particularly, the use of a water-swellable tape involves an appreciable increase in costs and a decrease in productivity, since these tapes are expensive and imply the addition of a wrapping stage to the cable production process. On the other hand, the presence of free-flowing water-swellable powders makes production and installation of the cable quite cumbersome.

Finally, cables are known in the art which are designed to attenuate the effect of the thermal cycles on the metal shield and at the same time to avoid propagation of moisture and/or water along the cable. These cable are provided with an outer semiconductive layer with V-shaped longitudinal grooves which are filled with a water-swellable material in the form of powder. The V-shaped geometry should ensure electrical contact between the semiconductive layer and the metal shield, on the one hand, and should assist the elastic recovery of the thermal dilations by the material which makes up the semiconductive layer, on the other hand.

However, producing these longitudinal grooves involves the use of a semiconductive layer of high thickness (about 2 mm or more), thereby increasing the cost and the overall weight of the cable. In addition, the desired geometry of the semiconductive layer is generally achieved by means of a precise process of extrusion in which appropriately designed dies are used. On the basis of the Applicant's experience, the formation of grooves of irregular geometry is, in practical terms, inevitable during such an extrusion process. These geometrical irregularities can give rise to a non-uniform distribution of the pressure exerted on the metal shield and thus prevent the semiconductive layer from correctly carrying out its function of elastic absorption of the radial forces.

Therefore, the cables according to the above prior art cannot effectively address both the problem of avoiding penetration and propagation of moisture and/or water inside the cable core, and the problem of possible deformations or breakages of the metal shield due to the cable thermal cycles, while maintaining a proper electrical contact between metal shield and cable core.

DETAILED DESCRIPTION

Figure 1:
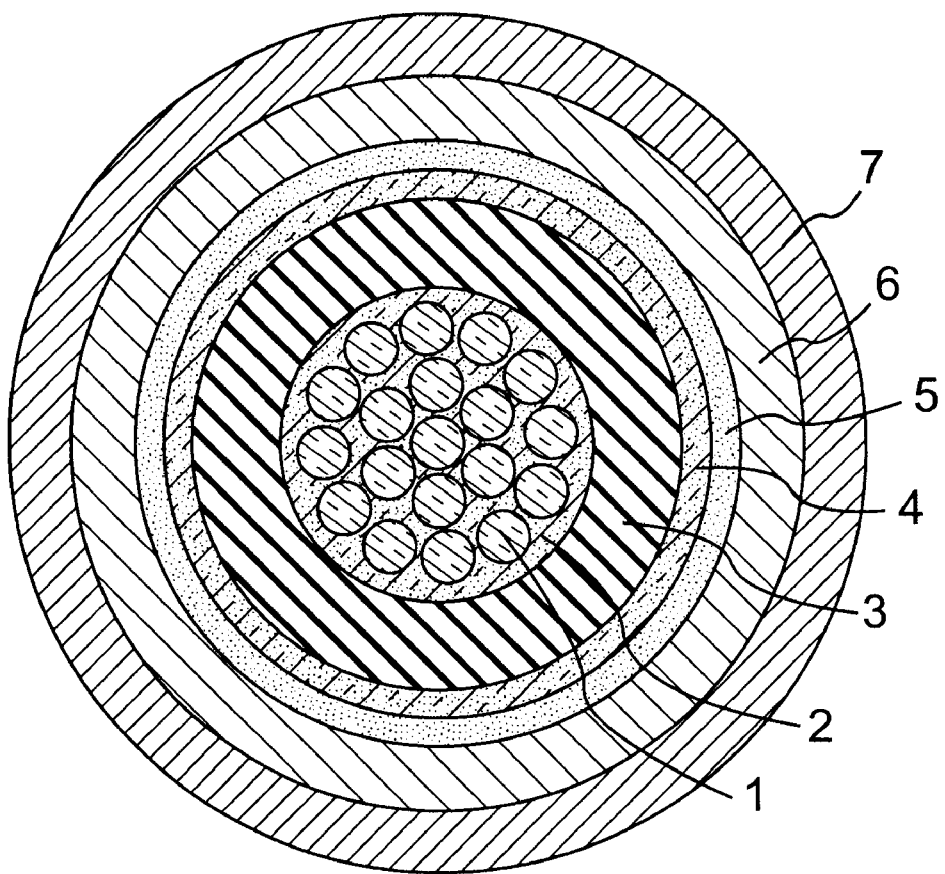
FIG. 1 shows a cross-section of a cable in accordance with one embodiment of the present invention.

The Applicant has now found the above problems can be effectively solved by inserting, under the metal shield, a layer of an expanded polymer material having semiconductive properties and including a water-swellable material. This layer is capable of elastically and uniformly absorbing radial forces of expansion and contraction due to the thermal cycles to which the cable is subjected during use, while ensuring the necessary electrical continuity between the cable and 'the metal shield. Moreover, the presence of the water-swellable material dispersed into the expanded layer is able to effectively block moisture and/or water, thus avoiding the use of water-swellable tapes or of free water-swellable powders.

In a first aspect, the present invention thus relates to an electrical cable comprising a conductor, at least one insulating layer, an outer metal shield and a layer of an expanded polymer material placed under the said metal shield, characterized in that the layer of the expanded polymer material is semiconductive and includes a water-swellable material.

In the following, the "layer of an expanded polymer material" will be concisely indicated as "expanded layer".

In the present description and claims, the term "expanded polymer material" is understood to refer to a polymer material with a predetermined percentage of "free" space inside the material, i.e. of space not occupied by the polymer but by a gas or air.

In general, the percentage of free space in an expanded polymer is expressed in terms of the degree of expansion (G), which is defined by the following formula:

$$G=(d_0/d_e-1)\cdot 100$$

where $d_0$ denotes the density of the non-expanded polymer and $d_e$ denotes the apparent density measured on the expanded polymer.

The degree of expansion of the expanded layer according to the present invention can vary within a wide range, depending both on the specific polymer material used and on the thickness of the coating which it is intended to obtain. The degree of expansion is predetermined so as to ensure that the radial forces of thermal expansion and contraction of the cable are elastically absorbed and, simultaneously, so as to maintain the semiconductive properties. In general, the degree of expansion can range from 5% to 500%, preferably from 10% to 200%.

As regards the thickness of the expanded layer according to the present invention, this is equal to at least 0.1 mm; it is preferably between 0.2 and 2 mm and even more preferably between 0.3 and 1 mm. Thicknesses below 0.1 mm are difficult to produce in practice and, in any case, only allow a limited compensation for the deformation, while thicknesses above 2 mm, although not having any functional drawbacks in principle, can be used when any specific requirements might justify the increased cost.

According to a preferred aspect, the electrical cable according to the present invention also comprises a compact semiconductive layer placed between the insulating coating and the expanded layer.

The term "compact semiconductive layer" is understood to refer to a layer made of non-expanded semiconductive material, i.e. a material having a degree of expansion substantially null.

According to the Applicant's perception, this compact semiconductive layer can advantageously carry out the function of preventing partial discharging, and thus damage to the cable caused by any irregularities in the surface of interface between the insulating coating and the expanded layer. This function can be performed even by a very thin semiconductive layer, namely of about 0.1 mm or even less. However, from the practical point of view, a thickness of between 0.2 and 1 mm is preferable, and even more preferably between 0.2 and 0.5 mm.

As indicated above, the expanded layer includes a water swellable material. As shown by the tests carried out by the Applicant, the expanded layer is able to incorporate large amounts of water swellable material and the incorporated water-swellable material is capable of expanding when the expanded layer is placed in contact with moisture or water, thus efficiently performing its water-blocking function.

The water swellable material is generally in a subdivided form, particularly in the form of powder. The particles constituting the water-swellable powder have preferably a diameter not greater than 250 µm and an average diameter of from 10 to 100 µm. More preferably, the amount of particles having a diameter of from 10 to 50 µm are at least 50% by weight with respect to the total weight of the powder.

The water-swellable material generally consists of a homopolymer or copolymer having hydrophilic groups along the polymer chain, for example: crosslinked and at least partially salified polyacrylic acid (for example the products Cabloc® from C. F. Stockhausen GmbH or Waterlock® from Grain Processing Co.); starch or derivatives thereof mixed with copolymers between acrylamide and sodium acrylate (for example products SGP Absorbent Polymer® from Henkel AG); sodium carboxymethylcellulose (for example the products Blanose® from Hercules Inc.).

To obtain an effective water-blocking action, the amount of water-swellable material to be included in the expanded layer is generally of from 5 to 120 phr, preferably of from 15 to 80 phr (phr=parts by weight with respect to 100 parts by weight of base polymer).

FIG. 1 shows a cross-section of an embodiment of an electrical cable according to the present invention, of unipolar type, for medium-voltage power transmission.

This cable comprises a conductor (1), an inner semiconductive layer (2), an insulating layer (3), a compact semiconductive layer (4), an expanded layer (5), a metal shield (6) and an outer sheath (7).

The conductor (1) generally consists of metal wires, preferably made of copper or aluminium, which are braided together using conventional techniques. The metal shield (6), usually made of aluminium or copper, or also lead, consists of a continuous metal tube or of a metal sheet shaped into a tube and welded or sealed using an adhesive material so as to make it watertight. The metal shield (6) is usually coated with an outer sheath (7) consisting of a crosslinked or non-crosslinked polymer material, for example polyvinyl chloride (PVC) or polyethylene (PE).

The polymer material which constitutes the expanded layer can be any type of expandable polymer such as, for example: polyolefins, copolymers of different olefins, copolymers of an olefin with an ethylenically unsaturated ester, polyesters, polycarbonates, polysulphones, phenol resins, urea resins, and mixtures thereof. Examples of suitable polymers are: polyethylene (PE), in particular low density PE (LDPE), medium density PE (MDPE), high density PE (HDPE), linear low density PE (LLDPE), ultra-low density polyethylene (ULDPE); polypropylene (PP); elastomeric ethylene/propylene copolymers (EPR) or ethylene/propylene/diene terpolymers (EPDM); natural rubber; butyl rubber; ethylene/vinyl ester copolymers, for example ethylene/vinyl acetate (EVA); ethylene/acrylate copolymers, in particular ethylene/methyl acrylate (EMA), ethylene/ethyl acrylate (EEA) and ethylene/butyl acrylate (EBA); ethylene/alpha-olefin thermoplastic copolymers; polystyrene; acrylonitrile/butadiene/styrene (ABS) resins; halogenated polymers, in particular polyvinyl chloride (PVC); polyurethane (PUR); polyamides; aromatic polyesters such as polyethylene terephthalate (PET) or polybutylene terephthalate (PBT); and copolymers thereof or mechanical mixtures thereof.

Preferably, the polymer material is a polyolefin polymer or copolymer based on ethylene and/or propylene, and is chosen in particular from:

(a) copolymers of ethylene with an ethylenically unsaturated ester, for example vinyl acetate or butyl acetate, in which the amount of unsaturated ester is generally between 5 and 80% by weight, preferably between 10 and 50% by weight;

(b) elastomeric copolymers of ethylene with at least one $C_3$–$C_{12}$ alpha-olefin, and optionally a diene, preferably ethylene/propylene (EPR) or ethylene/propylene/diene (EPDM) copolymers, generally having the following composition: 35–90% mole of ethylene, 10–65% mole of alpha-olefin, 0–10% mole of diene (for example 1,4-hexadiene or 5-ethylidene-2-norbornene);

(c) copolymers of ethylene with at least one $C_4$–$C_{12}$ alpha-olefin, preferably 1-hexene, 1-octene and the like, and optionally a diene, generally having a density of between 0.86 and 0.90 g/cm$^3$ and the following composition: 75–97% by mole of ethylene; 3–25% by mole of alpha-olefin; 0–5% by mole of a diene;

(d) polypropylene modified with ethylene/$C_3$–$C_{12}$ alpha-olefin copolymers, wherein the weight ratio between polypropylene and ethylene/$C_3$–$C_{12}$ alpha-olefin copolymer is between 90/10 and 10/90, preferably between 80/20 and 20/80.

For example, the commercial products Elvax® (Du Pont), Levapren® (Bayer) and Lotryl® (Elf-Atochem) are in class (a), products Dutral® (Enichem) or Nordel® (Dow-Du Pont) are in class (b), products belonging to class (c) are Engage® (Dow-Du Pont) or Exact® (Exxon), while polypropylene modified with ethylene/alpha-olefin copolymers are commercially available under the brand names Moplen® or Hifax® (Montell), or also Fina-Pro® (Fina), and the like.

Within class (d), particularly preferred are thermoplastic elastomers comprising a continuous matrix of a thermoplastic polymer, e.g. polypropylene, and fine particles (generally having a diameter of the order of 1–10 μm) of a cured elastomeric polymer, e.g. crosslinked EPR o EPDM, dispersed in the thermoplastic matrix. The elastomeric polymer may be incorporated in the thermoplastic matrix in the uncured state and then dinamically crosslinked during processing by addition of a suitable amount of a crosslinking agent. Alternatively, the elastomeric polymer may be cured separately and then dispersed into the thermoplastic matrix in the form of fine particles. Thermoplastic elastomers of this type are described, e.g. in U.S. Pat. No. 4,104,210 or EP-324,430. These thermoplastic elastomers are preferred since they proved to be particularly effective in elastically absorb radial forces during the cable thermal cycles in the whole range of working temperatures.

Products known in the art for the preparation of semiconductive polymer compositions can be used to give the polymer material semiconductive properties. In particular, an electroconductive carbon black can be used, for example electroconductive furnace black or acetylene black, and the like. The surface area of the carbon black is generally greater than 20 m$^2$/g, usually between 40 and 500 m$^2$/g. Advantageously, a highly conducting carbon black may be used, having a surface area of at least 900 m$^2$/g, such as, for example, the furnace carbon black known commercially under the tradename Ketjenblack®EC (Akzo Chemie Nev.).

The amount of carbon black to be added to the polymer matrix can vary depending on the type of polymer and of carbon black used, the degree of expansion which it is intended to obtain, the expanding agent, etc. The amount of carbon black thus has to be such as to give the expanded material sufficient semiconductive properties, in particular such as to obtain a volumetric resistivity value for the expanded material, at room temperature, of less than 500 Ω·m, preferably less than 20 Ω·m. Typically, the amount of carbon black can range between 1 and 50% by weight, preferably between 3 and 30% by weight, relative to the weight of the polymer.

The compact semiconductive layer optionally present between the insulating coating and the expanded layer, as well as the inner semiconductive layer, both of compact type, are prepared according to known techniques, in particular by extrusion, the polymer material and the carbon black being selected from those mentioned above for the expanded layer.

The insulating layer is preferably prepared by extrusion of a polyolefin selected from those mentioned above for the expanded layer, in particular polyethylene, polypropylene, ethylene/propylene copolymers, and the like. After extrusion, the material is preferably crosslinked by known techniques, for example using peroxides or via silanes.

The expanded layer can be prepared by extrusion of the polymer material containing the semiconductive filler and the water-blocking material onto the core of the cable, i.e. the assembly of the conductor (1), inner semiconductive layer (2), insulating layer (3) and optional compact semiconductive layer (6). The cable core can itself also be prepared by extrusion, in particular by coextrusion of the three layers according to known techniques.

The polymer material can be mixed with the semiconductive filler, the water-swellable material and other optional conventional additives according to methods known in the art. The mixing can be carried out, for example, using an internal mixer of the type with tangential rotors (Banbury) or with interpenetrating rotors, or alternatively in continuous mixers such as those of the type Ko-Kneader (Buss), or of the type co-rotating or counter-rotating twin-screw.

The expansion of the polymer is normally carried out during the extrusion phase. This expansion can take place either chemically, by addition of a suitable expanding agent, i.e. one capable of evolving a gas under specific temperature and pressure conditions, or alternatively, physically, by high-pressure injection of gas directly into the extruder cylinder. The expanding agent is preferably added to the polymer material only after addition of the fillers and other additives as described above and subsequent cooling of the mixture below the decomposition temperature of the expanding agent to avoid a premature expansion of the polymer. Particularly, the expanding agent can be advantageously added to the polymer composition during extrusion, e.g. through the extruder hopper.

Examples of suitable expanding agents are: azodicarbamide, para-toluenesulfonyl hydrazide, mixtures of organic acids (for example citric acid) with carbonates and/or bicarbonates (for example sodium bicarbonate), and the like.

Examples of gases to be injected at high pressure into the extruder cylinder are: nitrogen, carbon dioxide, air, low-boiling hydrocarbons, for example propane or butane, halogenated hydrocarbons, for example methylene chloride, trichlorofluoromethane, 1-chloro-1,1-difluoroethane and the like, or mixtures thereof.

Preferably, the die in the extruder head will have a diameter slightly smaller than the final diameter of the cable with expanded coating which it is intended to obtain, so that the expansion of the polymer outside the extruder allows to reach the desired diameter for the cable.

The selected extrusion temperature mainly depends on the nature of the polymer matrix, of the expanding agent and of the desired degree of expansion. Usually, an extrusion temperature not lower than 140° C. is preferred to reach a sufficient degree of expansion.

The expanded polymer material may or may not be crosslinked. The crosslinking can be carried out, after the extrusion and expansion phases, by known techniques, in particular by heating in the presence of a radical initiator, for example an organic peroxide such as dicumyl peroxide. Alternatively, a crosslinking can be carried out via silanes, which allows the use of a polymer such as those mentioned above, in particular a polyolefin, to which are covalently bonded silane units comprising at least one hydrolysable group, for example trialkoxysilane groups, in particular trimethoxysilane groups. The grafting of the silane units can take place by radical reaction with silane compounds, for example methyl triethoxysilane, dimethyldiethoxysilane, vinyldimethoxysilane, and the like. The crosslinking is carried out in the presence of water and a crosslinking catalyst, for example an organic titanate or a metal carboxylate. Dibutyltin dilaurate (DBTL) is particularly preferred.

Once the expanded layer has been prepared, the cable is enclosed inside the metal shield. According to a preferred embodiment, in the absence of applied forces, the diameter of the expanded layer is greater than the inside diameter of the metal shield, such as to obtain, after the metal shield has been applied, a predetermined degree of precompression of the expanded layer. This precompression makes it possible to achieve optimum contact between the expanded layer and the metal shield and can allow recovery of any residual deformation of the expanded layer, or else a certain degree of plastic deformation of the metal shield, during the phase of thermal contraction of the insulating layer.

Eventually, the metal shield can be coated with a protective sheath which can be obtained, for example, by extrusion of a polymer material, usually polyvinyl chloride or polyethylene.

A few illustrative examples will be given hereinbelow to further describe the invention.

EXAMPLES 1–2

Some mixtures suitable to form the expanded layer according to the present invention were prepared. The compositions are given in Table 1 (in phr). The components of the mixture were mixed together in a Banbury closed mixer (1.2 l working volume), loading first the base polymer, then, after a brief period of processing, the carbon black, the water swellable powder and the other additives (except the expanding agent).

The mixing was carried out for about 6 min with a final temperature for the extracted material of about 150° C. At the end of mixing the expanding agent was added to the mixture, the material being previously cooled to about 100° C. in order to avoid a premature decomposition of the expanding agent, which would lead to uncontrolled expansion of the polymer. The mixture was then compression moulded at 1600° C. using a frame 200×200 mm in size and 3 mm in thickness. The mixture was added in amounts such as to obtain an initial layer 1 mm thick, so as to leave sufficient space for the polymer to expand. The following characteristics were measured on the test pieces thus obtained:

apparent density, and then, knowing the density of the non-expanded material, degree of expansion was calculated according to the formula given above;

volume resistivity at room temperature.

The data are given in Table 1.

Some samples were placed in water: immediate expansion of the water swellable powder up to a volume about three times the initial volume was observed.

EXAMPLE 3

A medium-voltage cable was produced using the polymer composition of Example 1, according to the structure scheme reported in FIG. 1. The polymer composition was prepared according to Example 1, but without adding the expanding agent to avoid premature expansion of the composition. The expanding agent was introduced only during extrusion as described hereinbelow.

The cable core on which the expanded layer was to be deposited consisted of an aluminium conductor 70 mm$^2$ in cross section, coated with the following layers crosslinked vie peroxide on a catenary line:

an inner semiconductive layer made of EPR containing carbon black (0.5 mm thick);

an insulating layer made of EPR filled with kaolin (5.5 mm thick);

an outer semiconductive layer (compact) made of EVA containing 35% by weight of N472 carbon black (0.5 mm thick).

To deposit the expanded layer on this cable core (having an outside diameter of about 23 mm), a 80 mm single-screw extruder in configuration 25 D was used. The extruder was equipped with an initial section of the cylinder having longitudinal furrows, a box-type feed throat and a threaded discharge screw 25 D in length. The depth of the screw groove was 9.6 mm in the supply zone and 7.2 mm in the final section, for an overall screw compression ratio of about 1:1.33.

An electrically heated orthogonal extrusion head equipped with a conveyor belt with a double-suture line was used downstream of the extruder. The following die assembly was used: tip die 24 mm in diameter, ring compression die 24 mm in diameter. The tip die was chosen with the aim of allowing easy passage of the core to be coated, with a diameter about 1 mm greater than the diameter of the core to be coated. The ring die was, on the other hand, chosen with a diameter slightly smaller than the final diameter to be obtained, so as to prevent the material from expanding inside the extrusion head.

The following heat profile (°C.) was used for the extruder and the extrusion head:

| Feed throat | Screw | Zone 1 | Zone 2 | Zone 3 | Zone 4 | Zone 5 | Zone 6 | Collar | Head |
|---|---|---|---|---|---|---|---|---|---|
| 20 | neutral | 160 | 170 | 180 | 185 | 190 | 195 | 200 | 200 |

The throughput speed of the core to be coated was set as a function of the desired thickness of expanded material. In our case, a line speed of 1.2 m/min was used. Under these conditions, the following extrusion parameters were recorded:

Extruder rotation speed: 1.2 rpm;

Hot semi-finished diameter: 25.0 mm;

Cold semi-finished diameter: 24.8 mm.

The semi-finished product was cooled in air. Direct contact with the cooling water was avoided so as not to incur problems of accidental re-swelling of the water-blocking powder. The semi-finished product obtained was subsequently wound on a reel.

The material was deposited on the core in a thickness of about 1 mm. This material was expanded chemically, by adding about 2% of the expanding agent Hydrocerol® CF 70 (carboxylic acid+sodium bicarbonate) into the extruder hopper.

The electrical conductivity and the degree of expansion were measured on samples of the expanded layer thus obtained. The degree of expansion measured was about 20%.

Tests of expansion of the material in the presence of water (water-blocking effect) were also carried out: the material became swollen, by virtue of the presence of the water-swellable powder, up to a volume of about 3 times the initial volume.

EXAMPLE 4

A thermoplastic elastomer was used as base material to produce an expanded layer according to the present invention. The composition is reported in Table 1 (inclusive of the expanding agent that. was added only during extrusion). The mixing was carried out in the same Banbury mixer as described for Examples 1–2 with a mixing time of about 10 min and a final temperature for the extracted material of about 195° C. After mixing, the material was granulated and sealed in plastic bags to avoid absorption of moisture.

EXAMPLE 5

A medium-voltage cable was produced using the polymer composition of Example 4, according to the structure scheme reported in FIG. 1.

The cable core consisted of an aluminium conductor having a 150 $mm^2$ cross section and a 14.0 mm diameter, coated with the following layers, crosslinked via peroxide on a catenary line:

an inner semiconductive layer: product LE 0595 from Borealis (0.6 mm thick);

an insulating layer made of XLPE (4.65 mm thick);

an outer semiconductive layer (compact): product LE 0595 from Borealis (0.4 mm thick).

The expanded layer was deposited on this core (having an outside diameter of about 25.3 mm) by extrusion according to the technique described in Example 3, using a 30 mm single-screw extruder in configuration 24 D, a tip die of 25.7 mm diameter, a ring compression die of 26.1 mm diameter, and with the following thermal profile (°C.):

| Feed throat | Screw | Zone 1 | Zone 2 | Zone 3 | Collar | Head |
|---|---|---|---|---|---|---|
| 20 | floating | 190 | 200 | 210 | 200 | 200 |

The expanding agent was added during extrusion through the extruder hopper. The line speed was 2.9 m/min, with a screw speed of 56 rpm. The thickness of the expanded layer after extrusion and cooling was 0.65 mm.

The so obtained cable was then wrapped with a laquered aluminium stip (thickness: 0.2 mm) using an adhesive to bond the overlapping edges. Eventually, an external sheath made of PVC was applied by extrusion.

Two 3 m portion of the final cable were subjected to a test of penetration of water under thermal cycles according to Specification NF C 33-233 March 1998). After removal of a central portion (length: 50 mm) of the external coatings to reach the outer semiconductive layer (4), the cable specimens were immersed in water and kept at room temperature for 24 hours, then subjected to 10 thermal cycles of 8 hours each (4 hours of heating up to 100° C. by circulating electrical current along the conductor, then 4 hours of cooling). At the end of the test, water penetrated through the cutting for 20 cm at one side and for 25 cm at the other side, thus largely within the requirements of the specification (no water shall appear from the cable specimen extremities).

TABLE 1

| EXAMPLE | 1 | 2 | 4 |
|---|---|---|---|
| Elvax 200 470 | 100 | — | — |
| Elvax ® 265 | — | 100 | — |
| Profax ® PF 814 | — | — | 20 |
| Santoprene ® RC8001 | — | — | 80 |
| Ketjenblack ® EC 300 | 20 | 20 | 10 |
| Irganox ® 1010 | 0.5 | 0.5 | 0.2 |
| Irganox ® PS802 | — | — | 0.4 |
| Waterlock ® J550 | 40 | 40 | 25 |
| Hydrocerol ® CF70 | 2 | 2 | 2 |
| $d_o$ (g/$cm^3$) | 1.15 | 1.15 | 1.012 |
| $d_e$ (g/$cm^3$) | 0.95 | 0.95 | 0.86 |
| Degree of expansion (%) | 21 | 21 | 17.7 |
| Volume resistivity ($\Omega \cdot m$) | <15 | <15 | 2 |

Elvax® 470 (Du Pont): ethylene/vinyl acetate (EVA) copolymer (18% VA, melt index 0.7);

Elvax® 265 (Du Pont): EVA copolymer (28% VA, melt index 3.0);

Profax® PF 814 (Montell): isotactic propylene homopolymer (MFI=3 g/10'—ASTM D 1238);

Santoprene® RC8001 (Monsanto): thermoplastic elastomer (89% w cured EPR, 11% w polypropylene);

Ketjenblack® EC (Akzo Chemie): high-conductivity furnace carbon black;

Waterlock® J550 (Grain Processing Co.): grounded crosslinked polyacrylic acid (partially salified) (more than 50% by weight of particles having a diameter between 10 e 45 μm);

Hydrocerol® CF70 (Boeheringer Ingelheim): carboxylic acid/sodium bicarbonate expanding agent;

Irganox®1010: pentaerythryl-tetrakis[3-(3,5-di-tert-butyl-4-hydroxyphenyl)propionate] (Ciba-Geigy);

Irganox® PS802 FL: distearyl thiodipropionate (DSTDP) (Ciba-Geigy).

What is claimed is:

1. Electrical cable comprising a conductor, at least one insulating layer, an outer metal shield and a layer of an expanded polymer material placed under the metal shield, characterized in that the layer of the expanded polymer material is semiconductive and includes a water-swellable material, and wherein the layer of the expanded polymer material has a degree of expansion between 5% and 500%.

2. Cable according to claim 1, wherein the expanded layer has a predetermined degree of expansion so as to ensure elastic absorption of the radial forces of thermal expansion and contraction of the cable and to maintain the semiconductive properties.

3. Cable according to claim 2, wherein the degree of expansion of the expanded layer is between 10% and 200%.

4. Cable according to claim 1, wherein the thickness of the expanded layer is at least 0.1 mm.

5. Cable according to claim 4, wherein the thickness of the expanded layer is between 0.2 and 2 mm .

6. Cable according to claim 1, further comprising a compact semiconductive layer placed between the insulating layer and the expanded layer.

7. Cable according to claim 6, wherein the compact semiconductive layer has a thickness of from 0.1 to 1 mm.

8. Cable according to claim 7, wherein the compact semiconductive layer has a thickness of from 0.2 to 0.5 mm.

9. Cable according to claim 1, wherein the water-swellable material is in the form of powder.

10. Cable according to claim 9, wherein the water-swellable material is in the form of powder having a particle diameter not greater than 250 $\mu$m and an average particle diameter of from 10 to 100 $\mu$m.

11. Cable according to claim 10, wherein in the water-swellable material the amount of particles having a diameter of from 10 to 50 $\mu$m are at least 50% by weight with respect the total weight of the powder.

12. Cable according to claim 1, wherein the water swellable material is a homopolymer or copolymer having hydrophilic groups along the polymer chain.

13. Cable according to claim 1, wherein the water-swellable material is present in an amount of from 5 to 120 phr.

14. Cable according to claim 13, wherein the water-swellable material is present in an amount of from 15 to 80 phr.

15. Cable according to claim 1, wherein the polymer material which constitutes the expanded layer is an expandable polymer comprising: polyolefins, copolymers of different olefins, copolymers of an olefin with an ethylenically unsaturated ester, polyesters, polycarbonates, polysulfones, phenolic resins, or urea resins, or mixtures thereof.

16. Cable according to claim 15, wherein the polymer material is an olefin polymer comprising ethylene or propylene.

17. Cable according to claim 16, wherein the polymer material comprises:

(a) copolymers of ethylene with an ethylenically unsaturated ester, wherein the amount of unsaturated ester is between 5 and 80% by weight;

(b) elastomeric copolymers of ethylene with at least one $C_3$–$C_{12}$ alpha-olefin, and optionally a diene, having the following composition: 35–90% mole of ethylene, 10–65% mole of alpha-olefin, 0–10% mole of diene;

(c) copolymers of ethylene with at least one $C_4$–$C_{12}$ alpha-olefin, and optionally a diene, having a density of between 0.86 and 0.90 g/cm$^3$; or (d) polypropylene modified with ethylene/$C_3$–$C_{12}$ alpha-olefin copolymers, wherein the weight ratio between polypropylene and ethylene/$C_3$–$C_{12}$ alpha-olefin copolymer is between 90/10 and 10/90.

18. Cable according to claim 17, wherein the polymer material is a thermoplastic elastomer comprising a continuous matrix of a thermoplastic polymer and fine particles of a cured elastomeric polymer dispersed in the thermoplastic polymer.

19. Cable according to claim 15, wherein the polymer material is an olefin copolymer comprising ethylene and propylene.

20. Cable according to claim 1, wherein the expanded layer has a volumetric resistivity value for the expanded material at room temperature of less than 500 $\Omega\cdot$m.

21. Cable according to claim 1, wherein the expanded layer further comprises a predetermined amount of electroconductive carbon black.

22. Cable according to claim 21, wherein the electroconductive carbon black has a surface area of at least 20 m$^2$/g.

23. Cable according to claim 22, wherein the carbon black has a surface area of at least 900 m$^2$/g.

24. Cable according to claim 21, wherein the carbon black is present in amounts of between 5 and 80% by weight.

25. Cable according to claim 24, wherein the carbon black is present in amounts of between 10 and 70% by weight.

26. Cable according to claim 1, wherein the expanded layer is obtained by extrusion.

27. Cable according to claim 26, wherein the expansion of the layer is obtained during the extrusion by addition of an expanding agent.

28. Cable according to claim 26, wherein the expansion of the layer is obtained during extrusion by high-pressure injection of a gas.

29. Cable according to claim 1, wherein the diameter of the expanded layer, in the absence of applied forces, is greater than the inside diameter of the metal shield, so as to obtain a predetermined degree of precompression of the expanded layer after the metal shield has been applied.

* * * * *

UNITED STATES PATENT AND TRADEMARK OFFICE
CERTIFICATE OF CORRECTION

PATENT NO.     : 6,455,769 B1                                    Page 1 of 1
DATED          : September 24, 2002
INVENTOR(S)    : Sergio Belli et al.

It is certified that error appears in the above-identified patent and that said Letters Patent is hereby corrected as shown below:

<u>Title page,</u>
Item [57], delete the ABSTRACT in its entirety and insert therefor -- The present invention relates to an electrical cable having a semiconductive water-blocking expanded layer for medium or high voltage power transmission and distribution. The cable of the present invention avoids penetration and propagation of moisture inside the cable core and deformation of the metal shield due to cable thermal cycles, while maintaining proper electrical contact between the metal shield and cable core. It includes a conductor, at least one insulating layer, an outer metal shield, and a layer of expanded polymer under the shield. The expanded polymer is semiconductive and includes a water-swellable material. --.

<u>Column 11,</u>
Line 10, "predtermined" should read -- predetermined --.
Line 35, after "respect" insert -- to --.

Signed and Sealed this

Twenty-seventh Day of May, 2003

JAMES E. ROGAN
*Director of the United States Patent and Trademark Office*